United States Patent [19]

Dèprez et al.

[11] Patent Number: 4,575,672
[45] Date of Patent: Mar. 11, 1986

[54] CHOPPED POWER SUPPLY CONVERTER

[75] Inventors: Louis E. Dèprez, Palaiseau; Denys C. Klein, Orsay, both of France

[73] Assignee: Compagnie de Signaux et d'Entreprises Electriques, Paris, France

[21] Appl. No.: 584,251

[22] PCT Filed: Jun. 7, 1983

[86] PCT No.: PCT/FR83/00111
§ 371 Date: Feb. 6, 1984
§ 102(e) Date: Feb. 6, 1984

[30] Foreign Application Priority Data

Jun. 7, 1982 [FR] France .................. 82 09886

[51] Int. Cl.⁴ .............................................. G05F 1/10
[52] U.S. Cl. ...................................... 323/222; 363/21; 363/97
[58] Field of Search ................... 323/222; 363/17, 20, 363/21, 97

Primary Examiner—Patrick Salce
Assistant Examiner—Anita M. Ault

[57] ABSTRACT

A chopped power supply converter is provided comprising, between the two terminals of a DC power supply source, on the one hand a primary inductance ($L_p$) in series with a chopping means (Tr) and on the other hand a capacitive divider bridge formed by two capacitors ($C_1$-$C_2$), a secondary inductance ($L_s$) coupled to the primary inductance ($L_p$) and whose value with respect to this latter depends on the ratio of the capacitive divider bridge ($C_1$-$C_2$), this secondary inductance ($L_s$) being connected between the output terminal of the divider bridge and the load (P) through a series diode ($D_1$) and a parallel capacitor ($C_3$), and a balancing device (E) for permanently rebalancing said divider bridge.

3 Claims, 5 Drawing Figures

CHOPPED POWER SUPPLY CONVERTER

The present invention relates to a chopped power supply converter presenting very low rejection at the source.

A very well known structure allows very low rejection to be obtained, but under essentially voltage boosting working conditions, which may present disadvantages in some particular applications.

A more complex structure is also known allowing the output voltage to be brought down to the level of the input voltage, but with a polarity which is systematically reversed with respect to the input polarity, which may also present disadvantages.

The present invention has then as principle aim to remedy all these disadvantages and, for this, it provides a chopped power supply converter essentially characterized in that it comprises, between the two terminals of a DC power supply source, on the one hand a primary inductance in series with a chopping means and, on the other hand, a capacitive divider bridge formed of two capacitors, a secondary inductance coupled to the primary inductance and whose value with respect to this latter depends on the ratio of the capacitive divider bridge, this secondary inductance being connected between the output terminal of the divider bridge and the load by means of a series diode and a parallel capacitor, and a balancing device for permanently rebalancing said divider bridge.

As will be seen more clearly further on, such a structure allows the ratio of the voltage transfer to be readily adjusted by modifiying the ratio of the divider bridge, while keeping the characteristic of a substantially DC input current. Generally, it is desirable to obtain an output voltage equal to or less than the input voltage and, in this case, the ratio of the divider bridge is simply equal to or less than a half. In addition, the polarity of the output voltage is identical to that of the input voltage, the zero volt being common.

In a particular embodiment of the invention, the balancing device comprises two diodes arranged oppositely poled in parallel across the output circuit, and an energy storing inductance connected between the junction point between the two diodes and output terminal of the capacitive divider bridge.

In a variant of the invention, applicable more especially to supplying a circuit with non linear operation under starting conditions, the series diode and the balancing diode connected between the output of the secondary inductance and the energy storage inductance are replaced by thyristors, whereas the input of the secondary inductance is connected to both ends of the capacitive divider bridge respectively by a diode and another thyristor, the selective switching of these different thyristors providing passage successively from voltage dropping operation to operation as a dynamic non voltage-booster bridge, then to voltage booster operation.

Several embodiments of the invention are described hereafter, by way of examples, with reference to the accompanying drawings in which.

Figure 1:
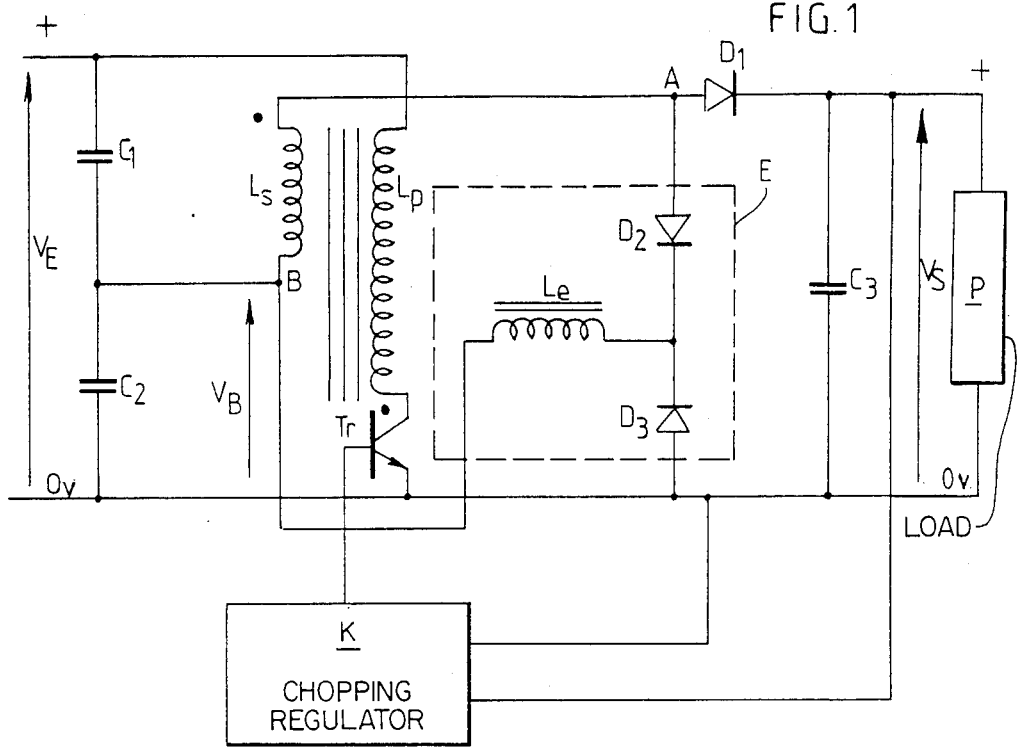
FIG. 1 is a partial block diagram of a chopped power supply converter in accordance with the invention.

The converter shown in FIG. 1 comprises first of all, between the two terminals OV and + of a DC power supply source, a primary inductance $L_p$ connected in series with a chopping means here formed by a transistor Tr receiving at its base control pulses from a chopping regulator K. Between the two terminals of the power supply source is also connected to a capacitive divider bridge formed by two capacitors $C_1$ and $C_2$. A secondary inductance $L_s$ is moreover coupled to the primary inductance $L_p$. This secondary inductance is connected between the middle point B of the capacitive divider bridge and load P through a series diode $D_1$ and a parallel capacitor $C_3$.

Figure 2:
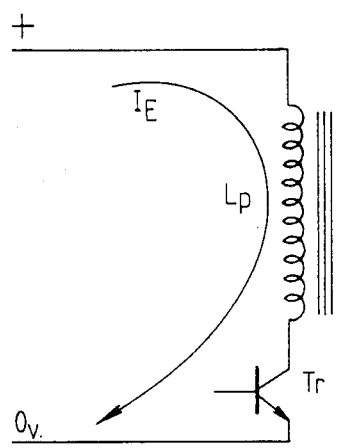
FIG. 2 is a diagram illustrating the operation of this converter in its first phase.

In a first operating phase, when transistor Tr is saturated, the input current $I_E$ is used mainly for storing the energy in the primary inductance $L_p$, as shown in FIG. 2.

This technique of storing energy under post operating conditions, in a magnetic core, has been described in patent application No. 82 04775 filed on Mar. 19, 1982, in the name of the applicant.

Figure 3:
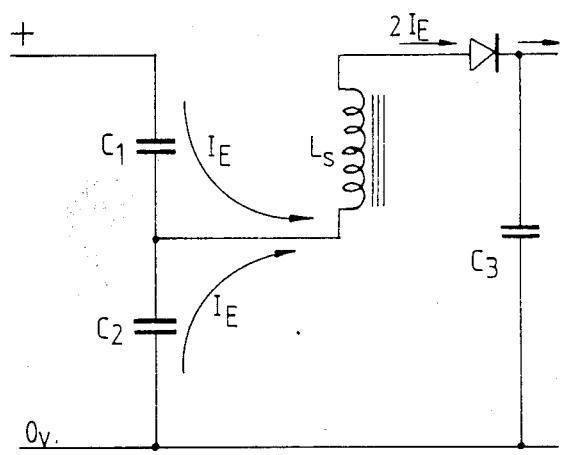
FIG. 3 is a diagram illustrating the operation of this converter in its second phase.

In a second operating phase, corresponding to disabling of transistor Tr, the input current $I_E$ passing through $C_1$ is added to the current from $C_2$ and then passes into the secondary inductance $L_s$, as shown in FIG. 3. The connecting direction of $L_s$ is such that the voltage at its terminals is added to the voltage $V_B$ at the middle point B of the capacitive divider bridge $C_1$-$C_2$. Furthermore, the value of this inductance depends on the ratio of the divider bridge.

Generally, under nominal operating conditions, it is desirable to obtain an output voltage $V_S$ close to the input voltage $V_E$. With $C_1$ equal to $C_2$, the ratio of the divider bridge is equal to a half and the voltage available at the terminals of the secondary inductance $L_s$ must then be equal to $V_E/2$ or $V_S/2$. $L_s$ must then have half the number of turns of $L_p$, so that $L_p$ equals $4L_s$.

Thus, the output voltage $V_s$ is equal to the input voltage $V_E$ and the same polarity, OV forming a common line for such a converter.

It will however be noted that during the second operating phase, capacitor $C_1$ has passing therethrough the input current $I_E$, which results in increasing the voltage at its terminals, whereas simultaneously capacitor $C_2$, which is subjected to no external energy supply, progressively discharges while delivering a current equal to $I_E$.

The initial condition $V_B = V_E/2$ could then no longer be maintained without further action and it is consequently necessary to provide a balancing device such as E for permanently rebalancing the capacitive divider bridge. The action of this device consists in transferring the excess charge of $C_1$ to $C_2$.

In the particular example described here, it is in fact a question of a voltage dropping converter comprising two diodes $D_2$ and $D_3$, oppositely poled between the output A of the secondary inductance $L_s$ and OV, and an inductance $L_E$ connected between the middle point B of the divider bridge and the junction point between the two diodes. Diode $D_2$ guarantees switching of the inductance $L_E$ only when point A is positive, whereas diode $D_3$, called free wheel diode, recovers the energy stored in $L_E$ and the filtering capacitor formed by the equivalent of $C_1$ and $C_2$.

The energy of this balancing device E results from the two previously described operating phases, so that the fluctuation rate of the input current is not affected and is thus uniformly distributed.

In certain particular applications, particularly for supplying a circuit with non linear operation under starting conditions, for example, a motor or a discharge lamp, it may be useful to be able to go over from a low rate voltage dropping configuration to the non voltage boosting configuration then to a voltage boosting configuration, using only a limited number of parts.

Figure 4:
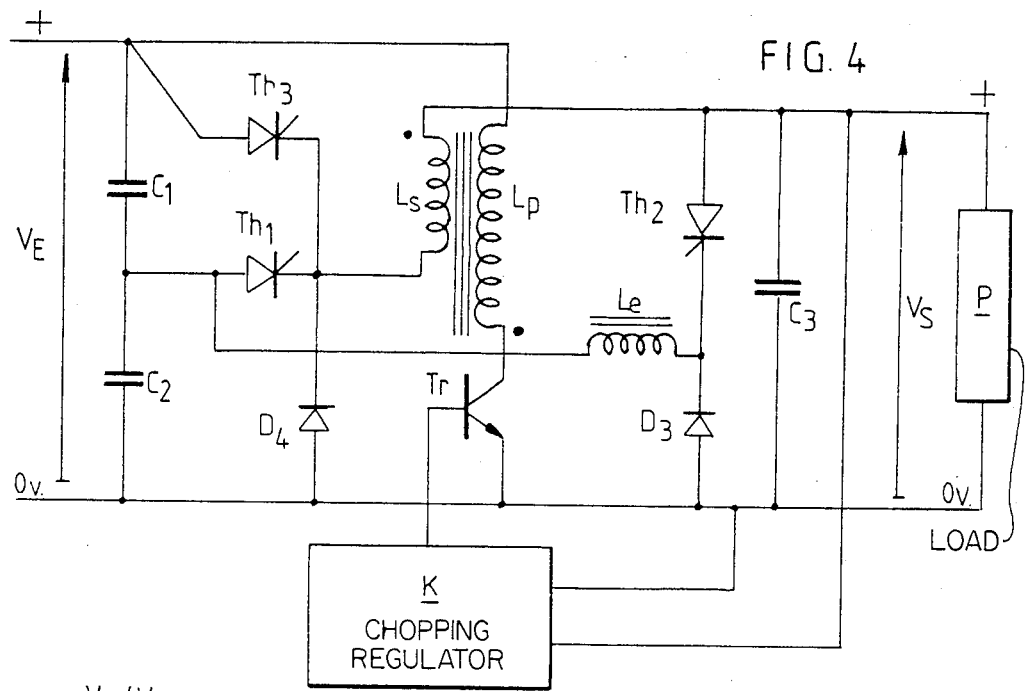
FIG. 4 is a partial block diagram of a variant of the invention capable of operating under different conditions.

The diagram of FIG. 4 shows precisely such a converter for readily obtaining several operating modes.

In this variant, the series diode $D_1$ is brought back upstream of the secondary inductance Ls and it is replaced by a thyristor $TH_1$. Similarly, diode $D_2$ of the balancing device is replaced by a thyristor $Th_2$. Finally, the input of the secondary inductance $L_s$ is connected to 0V of the power supply source by a diode $D_4$ and to the positive pole by another thyristor $Th_3$.

When the three thyristors $Th_1$, $Th_2$, and $Th_3$ are disabled, diode $D_4$ allows restitution from the potential 0V. Thus a voltage dropping mode is obtained, as illustrated by curve A in FIG. 5 which shows the transfer ratio $V_S/V_E$ as a function of the cyclic ratio $\tau/T$, T being the period and $\tau$ the conduction time of the chopping transistor Tr.

When thyristors $Th_1$ and $Th_2$ are enabled and when thyristor $Th_3$ is disabled, diode $D_4$ is also automatically disabled. We then find again the dynamic bridge configuration of FIG. 1 which corresponds to a non voltage boosting mode, as shown by curve B in FIG. 5.

Figure 5:
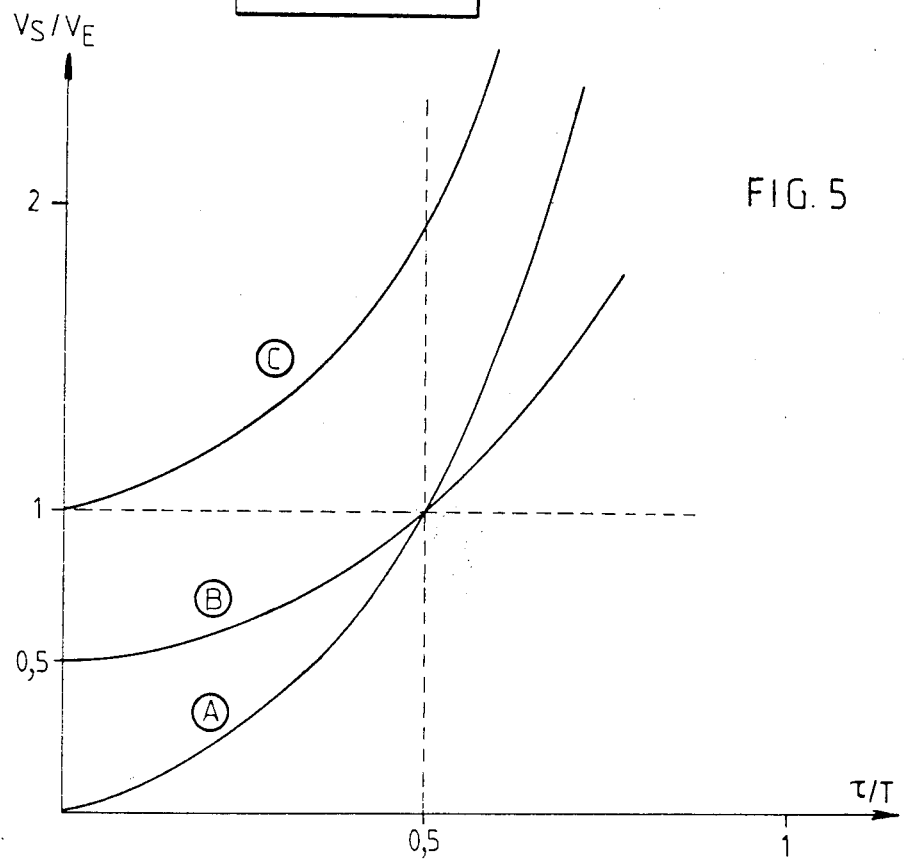
FIG. 5 is a diagram illustrating the different operating conditions of this embodiment.

Finally, when thyristor $Th_3$ is enabled and when thyristors $Th_1$ and $Th_2$ are disabled, the voltage boosting configuration is satisfied and thus corresponds to curve C of FIG. 5.

Thus it can be seen that the chopped power supply converter of the invention presents great flexibility in use due to the excellent dynamics which allows it to pass by steps from one configuration to the next.

We claim:

1. A chopped power supply converter comprising a DC power supply source having two terminals; between said terminals: a primary inductance in series with a chopping means, and a capacitive divider bridge formed of two capacitors and having an output terminal; a secondary inductance coupled to said primary inductance and having a value with respect to said primary inductance which depends on the ratio of the capacitive divider bridge, said secondary inductance being connected between said output terminal of the divider bridge and a load via a first, series diode and a parallel capacitor connected across the load, and a balancing device operatively connected to said divider bridge for permanently rebalancing said divider bridge.

2. A converter according to claim 1, wherein said balancing device comprises second and third diodes oppositely poled in parallel across an output circuit, and an energy storage inductance connected between the junction point between said second and third diodes and the output terminal of said capacitive divider bridge.

3. A chopped power supply converter comprising: a DC power supply source having two terminals; between said terminals: a primary inductance in series with a chopping means, and a capacitive divider bridge formed of two capacitors and having an input and an output terminal; a secondary inductance coupled to said primary inductance and having an input and an output, and also having a value with respect to said primary inductance which depends on the ratio of the capacitive divider bridge, said secondary inductance being connected between said output terminal of the divider bridge and a load through a first, series thyristor and a parallel capacitor connected across the load, and a balancing device operatively connected to said divider bridge for permanently rebalancing said divider bridge, said balancing device comprising a second thyristor and a first diode arranged in parallel across an output circuit, and an energy storage inductance connected between the junction point between said second thyristor and said first diode and said output terminal of said capacitive divider bridge, said second thyristor being connected between the output of said secondary inductance and the energy storage inductance, the input of said secondary inductance being connected to the input and output terminals of the capacitive divider bridge respectively by a second diode and by a third thyristor.

* * * * *